July 5, 1966 N. T. GENERAL 3,258,981
INFINITELY VARIABLE SPEED FRICTION DRIVE
Filed Dec. 30, 1963 2 Sheets-Sheet 2
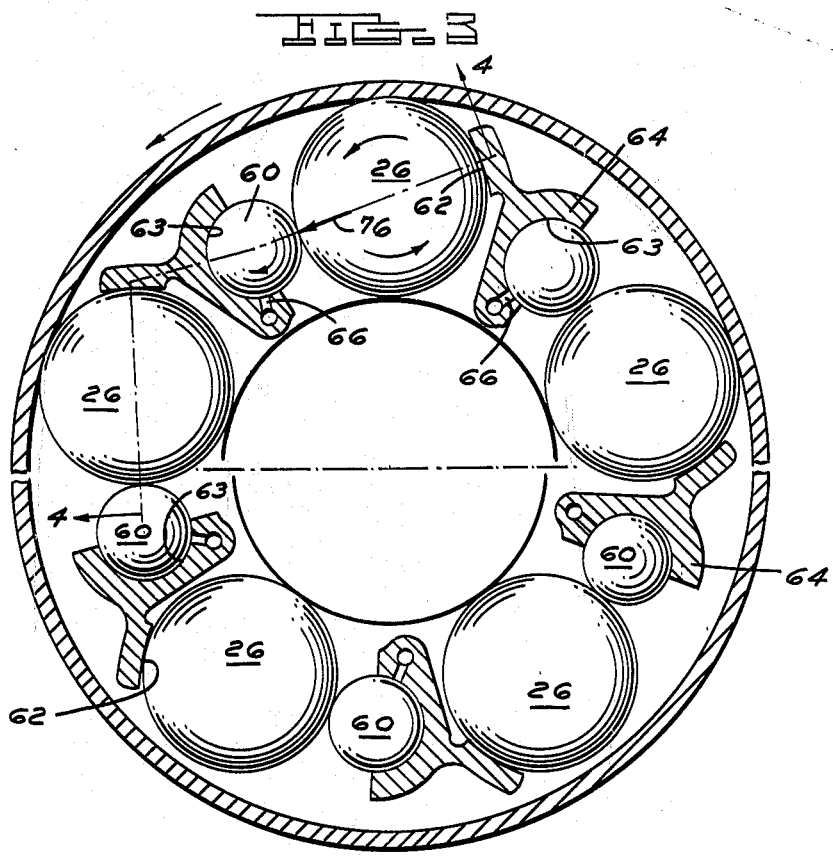
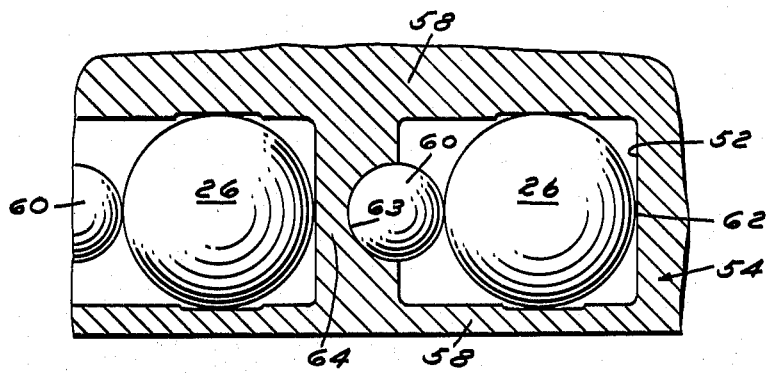
NORMAN T. GENERAL
INVENTOR
BY
John R. Faulkner
Robert E. McCollum
ATTORNEYS

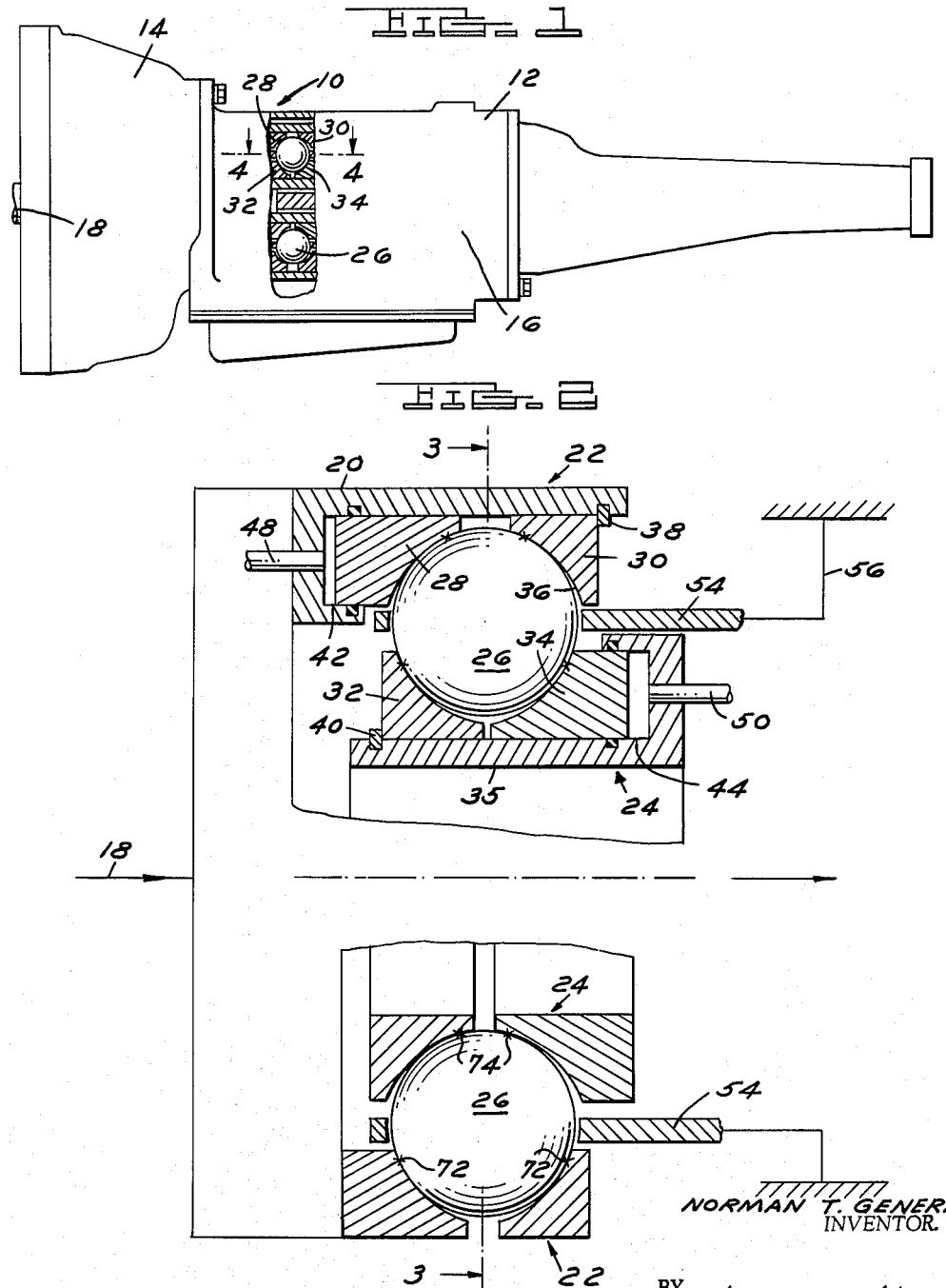

United States Patent Office 3,258,981
Patented July 5, 1966

3,258,981
INFINITELY VARIABLE SPEED FRICTION DRIVE
Norman Thomas General, Orchard Lake, Mich., assignor to Ford Motor Company, Dearborn, Mich., a corporation of Delaware
Filed Dec. 30, 1963, Ser. No. 334,424
11 Claims. (Cl. 74—198)

This invention relates to an infinitely variable speed friction drive transmission, wherein circumferentially spaced rolling friction elements, such as steel balls, for example, frictionally transmit a drive between power input and output race members.

More particularly, the invention relates to a minimum friction, low cost, hydrodynamic ball reaction means for such a transmission. The reaction ball is rotatably supported in a carrier member having a mating conforming seat that is supplied with fluid under pressure not only to lubricate the ball, but also to float it to reduce friction losses. The conforming lubricated seat not only provides a large bearing surface for the ball, thus increasing the capacity of the drive, but also maintains the reaction balls in their proper positions, reducing drift, and providing better control of the change in drive ratio. The sliding friction losses are also reduced.

One of the objects of the invention is to provide a friction drive transmission with a rolling element reaction member having a conforming seat hydrodynamically floating the rolling element.

It is a further object of the invention to provide a low cost hydrodynamic ball reaction means for an infinitely variable speed friction drive transmission, the stationary reaction member having a conforming seat hydrodynamically floating the reaction ball to substantially eliminate the friction reaction losses.

Other objects, features, and advantages of the invention will become apparent upon reference to the succeeding detailed description thereof, and to the drawings illustrating the preferred embodiment thereof; wherein, FIGURE 1 shows a transmission with parts broken away and in section illustrating the friction drive portion;

FIGURE 2 schematically shows a cross-sectional view of a friction drive embodying the invention;

FIGURE 3 is a cross-sectional view taken on a plane indicated by and viewed in the direction of the arrows 3—3 of FIGURE 2; and FIGURE 4 is a cross-sectional view of a portion of FIGURE 3, taken on a plane indicated by and viewed in the direction of the arrows 4—4 of FIGURE 3.

FIGURE 1 shows a friction drive device 10 as part of a transmission assembly enclosed by the housing 12. The transmission may or may not include a hydrodynamic coupling or torque converter in housing portion 14, and a planetary gearset in portion 16.

FIGURE 2 shows schematically the friction drive constructed according to the invention. A power input shaft 18 is driven by any suitable source of power, such as for example, the internal combustion engine for a motor vehicle. Shaft 18 is drivingly connected to the annular cover 20 of an outer race 22 constituting one portion of the friction drive device 10. This device includes an inner race 24, the races frictionally engaging a plurality of circumferentially spaced main drive balls 26.

Both the inner and outer races are constructed in a similar manner, having axially spaced portions 28, 30 and 32, 34. Outer race portions 28 and 30 are axially slidably splined to the cover 20, as are inner portions 32 and 34 to the cover 35. The race portions have concave complementary surfaces together defining an annular raceway 36 within which the balls 26 are rollingly mounted. The balls have a point contact engagement with the race portions to provide a frictional drive in a manner to be described.

Diametrically opposite race portions 30 and 32 are located axially against snap rings 38 and 40. The race portions 28 and 34 are axially slidably and sealingly mounted within cylinders 42 and 44 defined by annular extensions of the covers 20 and 35, to vary the drive ratio. The cylinders are adapted to be supplied with fluid under pressure through suitable conduits 48 and 50 connected to a fluid pressure control system, not shown.

As best seen in FIGURES 2, 3, and 4, the balls 26 are mounted in pockets or recesses 52 in an annular carrier member 54. The carrier is held stationary at all times by a connection 56 to the transmission housing, and therefore constitutes the reaction member for the friction drive. The main drive balls 26 are confined radially by the races 22 and 24, and laterally by the circumferential connecting arm portion 58 of the carrier. Each of the balls is located circumferentially between a small reaction ball 60, and a bearing pad 62 extending from the carrier crosspiece 64. The pad 62 has a concave shape providing a point contact frictional engagement with ball 26, thereby permitting radial movement of the drive ball 26 while still maintaining engagement with the pad 62 and reaction ball 60. The reaction ball 60 is received within a hemispherical, conforming seat 63 formed in a portion of the crosspiece 64.

The seat 63 is connected to a source of fluid under pressure through a passage 66, so that a film of oil can be supplied between the reaction ball 60 and its seat 63, for purposes to be described.

In operation, the upper portion of FIGURE 2 shows the ball drive conditioned for a maximum underdrive or reduction. The inner race portion 34 has been moved towards race portion 32 by fluid at a high pressure in line 50, forcing the ball 26 outwardly to separate the outer race portions 28 and 30. Fluid under pressure in line 48, is low enough to permit the separation of the race elements 28 and 30 but, at the same time, is high enough to clamp all the elements together to transmit a drive through the device. The lower portion of FIGURE 2 shows the friction drive adjusted to its other extreme to provide an overdrive of the inner race 24 with respect to the outer race 22. The race portions have frictional engagements with the balls at points 72 and 74. The control system will automatically provide changes in the pressures in lines 48 and 50 in inverse proportion to each other to change the drive ratio automatically in infinite increments between an underdrive and overdrive.

Clockwise rotation of input shaft 18 rotates outer race 22 clockwise to roll balls 26 in the same direction about the stationary carrier 54, and, therefore, drive the inner race 24 in an opposite direction. As seen in FIGURE 3, the reaction for the rolling of the balls 26 comes from the small balls 60 seated in their conforming seats 62. The application of torque in a counterclockwise direction causes the main drive balls 26 to be loaded against the reaction balls 60, as shown by arrow 76, and frictionally drive them in a clockwise direction at an overdrive rate. The initial clockwise spinning movement of the balls 60 causes the oil in passage 66 to be introduced to seat 63 at the spin-in side of the balls, causing the balls 60 to be coated with a thin layer of oil. This not only lubricates the seat 62, and therefore, reduces friction losses, but also serves as a cooling fluid to reduce any heat generated. The fluid also is transferred, via the main balls 26, to the pad 62 to lubricate it. As the speed of the drive balls 26 increases, the higher spin speeds of the reaction balls causes the oil film between the balls 60 and the seats 63 to build up in thickness. This results in the balls 60 being floated on their seats, which virtually eliminates all friction losses.

From the foregoing, therefore, it will be seen that the invention provides a friction drive construction that virtually eliminates reaction friction losses, thereby increasing operating efficiency and wear life of the parts. It will also be seen that because of the large bearing surface provided by the hemispherical conforming reaction seats 63, that better control of the operation of the drive unit is provided, resulting in reduced sliding friction losses. Thus, less drift of the balls results, and the reaction balls are maintained in their proper positions. The point contact of the main balls 26 with the reaction balls 60 and pad 62 enables radial adjustment of the balls with a minimum sliding therebetween. It will also be seen that the conforming lubricated reaction seat reduces the sliding due to the increased bearing area, and therefore reduces the heat generated.

While the invention has been shown in its preferred embodiment, it will be clear to those skilled in the art to which the invention pertains that many changes and modifications may be made thereto without departing from the scope of the invention.

I claim:

1. An infinitely variable speed friction drive device comprising a pair of spaced annular friction races, a friction element cage reaction member, a main friction element rotatably mounted in said cage member and frictionally engaging portions of said races and having an axis of rotation movable to engage said main element with different portions of said races to condition said device for different drives, and a second friction element reaction member frictionally engaging said main element to all times to be rotated thereby and being rotatably received in a conforming portion of said cage member.

2. An infinitely variable speed ball friction drive device comprising a pair of spaced annular ball races, a stationary ball cage reaction member, a drive ball rotatably mounted in said cage member and frictionally engaging portions of said races and being movable relative to said cage member and races to engage different portions of said races to condition said device for different drives, and a reaction ball member between said cage member and drive ball frictionally engaging said drive ball to be driven thereby and being rotatably received in a conforming portion of said stationary cage.

3. An infinitely variable speed ball friction drive device comprising a pair of spaced annular ball races, a stationary ball cage reaction member, a drive ball rotatably mounted in said cage member and frictionally engaging portions of said races and being movable relative to said cage and races to engage different portions of said races to condition said device for different drives, and a reaction ball member between said drive ball and cage member frictionally engaging said drive ball to be driven thereby and being rotatably received in a conforming hemispherical portion of said cage.

4. An infinitely variable speed ball friction drive device comprising a pair of spaced annular ball races, a stationary ball cage reaction member, a drive ball rotatably mounted in said cage member and frictionally engaging portions of said races and having an axis of rotation movable to engage said ball with different portions of said races to condition said device for different drives, and a ball reaction member frictionally engaging said drive ball to be driven thereby and being rotatably received in a conforming portion of said cage member, said conforming portion being supplied with fluid under pressure to float said reaction ball thereby minimizing friction reaction losses.

5. A torque transmitting device comprising an infinitely variable speed friction drive mechanism having rotatable annular race members separated by a rolling drive element frictionally engaging portions of said members and being adjustable relative to said race members to contact other portions to condition said mechanism for a different drive, first means including an annular cage member for rotatably supporting said drive element, means for driving one of said race members, and means for holding said cage member stationary to constitute a reaction member for said mechanism to transmit a drive between said race members, said first means including an additional rolling element frictionally engaging said drive element to be driven thereby, said cage member being formed with a seat movably receiving said second element, the seat and said second element having mating conforming curvatures providing a substantial bearing area for said second roller element.

6. An infinitely variable speed ball friction drive device comprising a pair of spaced annular drive and driven ball races, a stationary ball reaction cage, a drive ball rotatably mounted in said cage and frictionally engaging portions of said races and being movable relative to said races and cage to engage different portions of said races to vary the drive through said device, and a reaction ball member frictionally engaging said drive ball to be driven thereby and being rotatably received in a conforming portion of said stationary cage.

7. A torque transmitting device comprising, power input and output shafts, and means connecting said shafts providing a plurality of drives therebetween, said means comprising an infinitely variable speed ball friction drive device having spaced annular races secured respectively to said shafts, a plurality of circumferentially spaced drive balls between and frictionally engaging portions of said races and separating the same, an annular stationary ball cage member rotatably supporting said drive balls and permitting adjustment thereof to contact different portions of said races to vary the drive, said cage constituting a reaction member for said device, and a reaction ball between said cage and each of said drive balls frictionally engaging the associated drive ball to be driven thereby, said cage having conforming hemispherical seats receiving said reaction balls, said seats being supplied with fluid under pressure to lubricate and at times float said reaction balls to minimize friction reaction losses.

8. An infinitely variable speed ball friction drive device comprising a pair of annular rotatable ball races spaced and frictionally engaged by a plurality of spaced ball drive transmitting elements therebetween, a stationary ball element reaction cage having separate bearing portions engageable by each of said ball elements, and a reaction ball member separately associated with and frictionally engaging each of said drive ball elements to be driven thereby, said reaction ball members being rotatably received in conforming portions of said stationary cage.

9. An infinitely variable speed ball friction drive device comprising a pair of annular rotatable ball races spaced and frictionally engaged by a plurality of spaced ball drive transmitting elements therebetween, a stationary ball element reaction cage having ball element bearing portions separating said ball elements, and a ball reaction member between each of said portions and one of said ball elements frictionally engaging the associated ball element to be driven thereby, said portions each having an essentially semi-spherical seat conforming to and rotatably receiving and locating said ball reaction member to provide a substantial bearing surface for said ball reaction member.

10. A drive device as in claim 8, including means supplying said conforming portions with fluid under pressure to lubricate said seats and reaction ball members and float said latter members at higher speeds of said races.

11. An infinitely variable speed ball friction drive device comprising a pair of annular rotatable ball races radially spaced and frictionally engaged by a plurality of circumferentially spaced ball drive transmitting elements therebetween, a stationary ball element reaction cage having pockets receiving said ball elements and defined by bearing pad portions extending across the spaces between said ball elements, said portions being engageable by each of said ball elements, said drive elements being radially adjustable relative to said cage and races to vary the drive between said races, and a reaction ball member receivable in each of said pockets and frictionally engaging the drive ball element therein to be driven thereby, said reaction ball members being rotatably received in conforming seats in said bearing portions, said seats being supplied with fluid under pressure to lubricate said seats and ball members and elements and pads and float said reaction ball members at higher race speeds.

References Cited by the Examiner

UNITED STATES PATENTS

| | | | |
|---|---|---|---|
| 1,574,803 | 3/1926 | Erban | 74—798 |
| 2,913,932 | 11/1959 | Oehrli | 74—796 |
| 2,951,384 | 9/1960 | Rouverol | 74—198 |

DAVID J. WILLIAMOWSKY, *Primary Examiner.*

DON A. WAITE, *Examiner.*

L. H. GERIN, *Assistant Examiner.*